United States Patent [19]

Tashiro et al.

[11] Patent Number: 4,628,435
[45] Date of Patent: Dec. 9, 1986

[54] FACILITIES CONTROL METHOD

[75] Inventors: Tsutomu Tashiro, Sagamihara; Koichi Haruna, Yokohama; Norihis Komoda, Kawasaki, all of Japan

[73] Assignee: Hitachi, Ltd., Tokyo, Japan

[21] Appl. No.: 578,676

[22] Filed: Feb. 9, 1984

[30] Foreign Application Priority Data

Mar. 9, 1983 [JP] Japan .................................. 58-37392

[51] Int. Cl.⁴ ............................................ G06F 15/46
[52] U.S. Cl. .................................... 364/130; 364/141; 364/148; 364/300; 364/468
[58] Field of Search ............... 364/130, 140, 141, 148, 364/300, 402, 200 MS File, 900 MS File, 152, 468, 478

[56] References Cited

U.S. PATENT DOCUMENTS

| | | | |
|---|---|---|---|
| 3,460,096 | 8/1969 | Barron | 364/152 X |
| 3,715,730 | 2/1973 | Smith et al. | 364/200 |
| 3,716,840 | 2/1973 | Masten et al. | 364/200 |
| 3,725,875 | 4/1973 | Choate et al. | 364/200 |
| 4,210,962 | 7/1980 | Marsh et al. | 364/402 |
| 4,368,509 | 1/1983 | Li | 364/148 |

*Primary Examiner*—Joseph Ruggiero
*Attorney, Agent, or Firm*—Antonelli, Terry & Wands

[57] ABSTRACT

A multi-facility control system includes a controller and attendant memory. Stored in the memory are a plurality of rules, each of which includes a conditional portion representative of a condition to be examined and a conclusive portion describing action to be taken when the condition is satisfied. Also stored in memory is the current status of each facility, information representative of the tasks to be performed by the facilities and updated status information resulting from the satisfaction of the conditional parts of the rules. The controller monitors the status of the facilities and compares monitored status information with the conditional parts of the rules stored in memory. When rule conditions are satisfied, control instructions are generated which are employed to produce command signals that are coupled to the respective facilities for controlling the operations thereof.

6 Claims, 20 Drawing Figures

FORMAT OF CHARACTER STRING OF IF-THEN RULE

FORMAT OF IF-THEN RULE

| FORM | IF PART | THEN PART |
|---|---|---|
| 1 | IF (···⟨CONSTANT⟩····⟨CONSTANT⟩···) | THEN (···⟨CONSTANT⟩········) |
| 2 | IF (···⟨VARIABLE⟩····⟨CONSTANT⟩···) | THEN (···⟨VARIABLE⟩···⟨VARIABLE⟩····) |
| 3 | IF (···⟨VARIABLE⟩····⟨VARIABLE⟩···) | THEN ⟨NAME OF PROCEDURE⟩(··⟨VARIABLE⟩··) |

FIG. 3

JOB ASSIGNING

| NO. | RULE |
|---|---|
| NO.1 | IF WORKPIECE <X> IS AT HEAD OF THE QUEUE) <br> THEN (ASSIGN WORKPIECE <X>) |
| NO.2 | IF (STATION <Z> IS USABLE FOR <Y>) <br> IF (STATION <Z> IS EMPTY) <br> IF (ASSIGN WORKPIECE <X>) <br> IF (JOB FOR WORKPIECE <X> IS <Y>) <br> THEN (STATION <Z> IS THE JOB ALTERNATIVE FOR WORKPIECE <X>) |
| NO.3 | IF (STATION <Z> IS THE JOB ALTERNATIVE FOR WORKPIECE <X>) <br> THEN <MIN. Z> (OPERATE ON THE LOWER NUMBERED STATION <Z>) |
| NO.4 | IF (CARRIER <I> IS EMPTY) <br> IF (OPERATE ON THE LOWER NUMBERED STATION <Z> <br> IF (ASSIGN WORKPIECE <X>) <br> IF (JOB OF WORKPIECE <X> IS <Y>) <br> THEN (CARRIER <I> SHALL TRANSFER THE PROVIDED WORKPIECE <X> TO STATION <Z>) <br> THEN (STATION <Z> SHALL EXECUTE JOB <Y>) |

CARRYING OUT OF PRODUCTS

| NO. | RULE |
|---|---|
| NO.5 | IF (STATION <Z> HAS COMPLETED THE JOB FOR WORKPIECE <X>) <br> THEN (CARRY OUT WORKPIECE <X>) |
| NO.6 | IF (CARRY OUT WORKPIECE <X>) <br> THEN <MIN. X> (CARRY OUT THE LOWER NUMBERED WORKPIECE <X>) |
| NO.7 | IF (CARRIER <2> IS EMPTY) <br> IF (STATION <Z> COMPLETED THE JOB FOR WORKPIECE <X>) <br> IF (CARRY OUT WORKPIECE <X>) <br> THEN (CARRIER <2> SHALL CARRY OUT WORKPIECE <X> AT STATION <Z>) |

FIG. 6

INPUT SIGNAL-CHARACTER STRING
CORRESPONDENCE TABLE 61

| ENTRY OF STATUS SIGNAL LINE | CHARACTER STRING OF FACILITY STATUS |
|---|---|
| ADDRESS A | (WORKPIECE <X> IS AT HEAD OF THE QUEUE) |
| ADDRESS B | (STATION<2> IS EMPTY) |
| ADDRESS C | (STATION<2> IS WORKING) |
| ADDRESS D | (STATION<2> HAS COMPLETED THE JOB FOR WORKPIECE <X>) |
| | |

CHARACTER STRING-OUTPUT SIGNAL
CORRESPONDENCE TABLE 64

| ENTRY TO COMMAND SIGNAL LINE | CONTROL COMMAND CHARACTER STRING |
|---|---|
| ADDRESS E | (CARRIER<I> SHALL TRANSFER THE PROVIDED WORKPIECE <X> TO STATION<Z>) |
| ADDRESS F | (STATION<I> SHALL EXECUTE JOB ASSEMBLING<A>) |
| | |

FIG. 7

RULE SETS TRIGGER
CONDITION TABLE 71

| ENTRY TO STATUS SIGNAL LINE | TRIGGER RULE SETS NAME |
|---|---|
| ADDRESS A | JOB ASSIGNING |
| ADDRESS D | PRODUCTS DELIVERED |
|  |  |

AREA OF RULE
SETS NAME 72

| JOB ASSIGNING |
|---|

FIG. 8

RULE SETS DIRECTORY 81

| RULE SETS NAME | HEAD POSITION OF RULE SETS | THE LAST POSITION OF RULE SETS |
|---|---|---|
| JOB ASSIGNING | 1 | 4 |
| CARRYING OUT OF PRODUCTS | 5 | 7 |

RULE TABLE 82

| RULE TYPE | IF PART CHARACTER STRING | THEN PART CHARACTER STRING |
|---|---|---|
| 0 | (WORKPIECE ⟨X⟩ IS AT HEAD OF THE QUEUE) | (ASSIGN WORKPIECE ⟨X⟩) |
| 1 | (CARRIER⟨I⟩ IS EMPTY) (OPERATE ON THE LOWER NUMBERED STATION⟨Z⟩) (ASSIGN WORKPIECE ⟨X⟩) (JOB OF WORKPIECE ⟨X⟩ IS ⟨Y⟩) | (CARRIER⟨I⟩ SHALL TRANSFER THE PROVIDED WORKPIECE ⟨X⟩ TO STATION⟨Z⟩) (STATION⟨Z⟩ SHALL EXECUTE JOB⟨Y⟩) |
| 0 | (STATION⟨Z⟩ HAS COMPLETED THE JOB FOR WORKPIECE ⟨X⟩) | (CARRYING OUT OF WORKPIECE ⟨X⟩) |

FIG. 9

LAST POSITION AREA OF FIXED PART
╶92

CHARACTER STRING STORING TABLE ╶91

| |
|---|
| (STATION<1> IS USABLE FOR <ASSEMBLING A>) |
| (STATION<1> IS USABLE FOR <FABRICATION-ASSEMBLING B>) |
| (STATION<3> IS USABLE FOR <FABRICATION-ASSEMBLING B>) |
| (WORKPIECE <34> IS AT HEAD OF THE QUEUE) |
| (JOB OF WORKPIECE <34> IS <ASSEMBLING A>) |
| |
| |
| |
| |

CONTROL COMMAND CHARACTER STRING TABLE ╶93

| |
|---|
| (CARRIER SHALL TRANSFER THE PROVIDED WORKPIECE <34> TO STATION<1>) |
| (STATION<1> SHALL EXECUTE THE JOB <ASSEMBLING A>) |
| |
| |

VALUE OF VARIABLE TEMPORARY TABLE

| W | X | Y | Z | 94 |
|---|---|---|---|---|
|   |   |   | 2 |   |
|   |   |   |   |   |
|   |   |   |   |   |
|   |   |   |   |   |

AND LOGIC MET VALUE OF VARIABLE TABLE

| W | X | Y | Z | 95 |
|---|---|---|---|---|
|   |   | ASSEMBLING A | 1 |   |
|   |   | FABRICATION-ASSEMBLING B | 1 |   |
|   |   | ASSEMBLING A | 2 |   |
|   |   | FABRICATION-ASSEMBLING B | 3 |   |
|   |   |   |   |   |

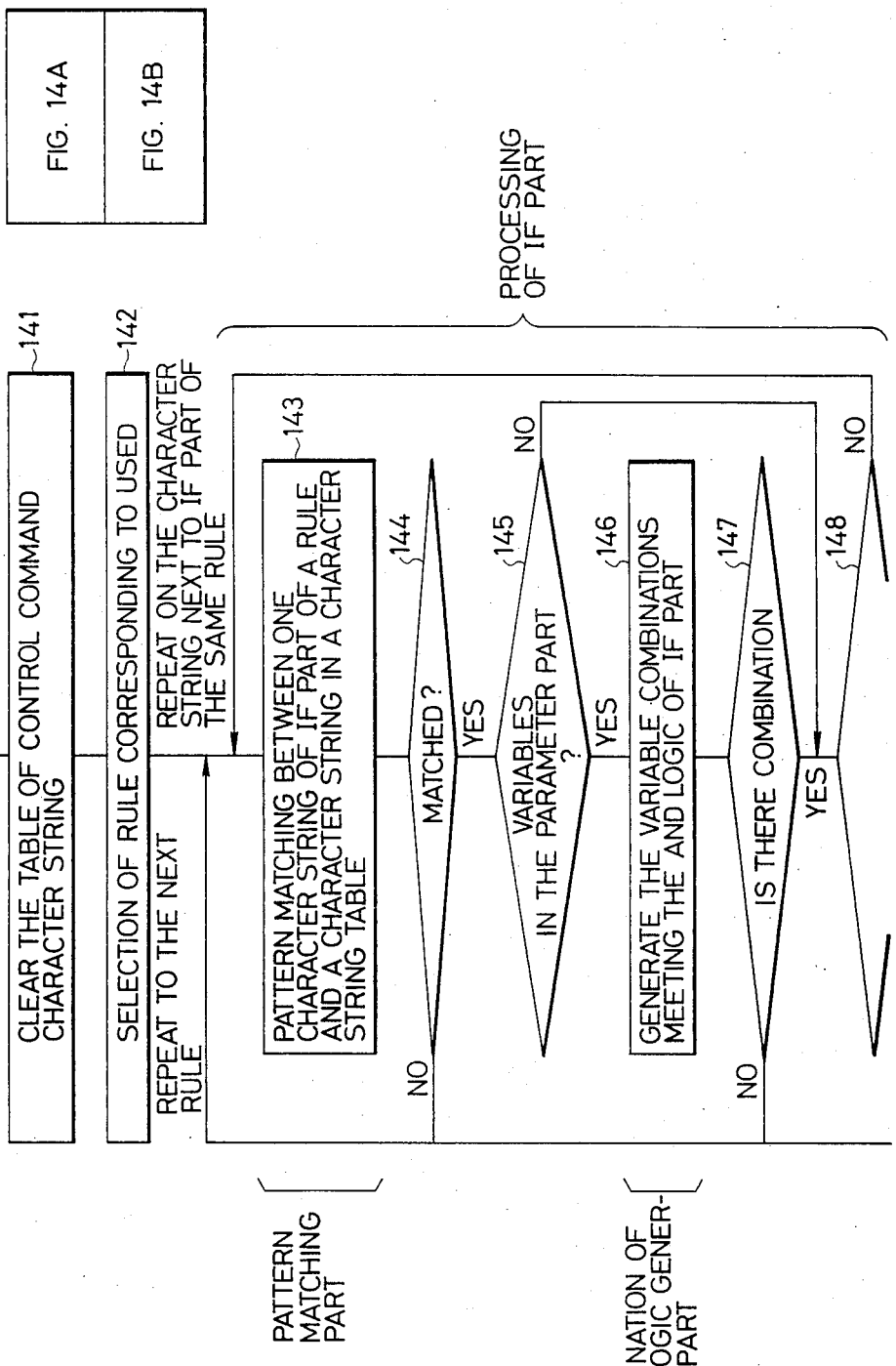

VALUE OF VARIAB-
LE TEMPORARY
TABLE

AND LOGIC MET
VARIABLE TABLE

AND LOGIC MET
VARIABLE TABLE

FIG. 18

JOB ASSIGNING

| NO. | RULE |
|---|---|
| NO.1 | IF WORKPIECE <X> IS AT HEAD OF THE QUEUE) <br> THEN(ASSIGN WORKPIECE <X>) |
| NO.2 | IF (STATION<Z> IS USABLE FOR<Y>) <br> IF (STATION<Z> IS EMPTY) <br> IF (ASSIGN WORKPIECE <X>) <br> IF (JOB OF WORKPIECE <X> IS<Y>) <br> THEN(STATION<Z> IS THE JOB ALTER- NATIVE FOR WORKPIECE <X>) |
| NO.3 | IF (STATION<Z> IS THE JOB ALTER- NATIVE FOR WORKPIECE <X>) <br> THEN<MIN.Z>(OPERATE ON THE LOWER NUMBERED STATION<Z>) |
| NO.4 | IF (CARRIER<I> IS EMPTY) <br> IF (OPERATE ON THE LOWER NUMBERED STATION<Z>) <br> IF (ASSIGN WORKPIECE <X>) <br> IF (JOB OF WORKPIECE <X> IS<Y>) <br> THEN(CARRIER<I> SHALL TRANSFER THE PROVIDED WORKPIECE <X> TO STATION<Z>) <br> THEN(STATION<Z> SHALL EXECUTE JOB<Y>) |

ALTERNATIVE RULES ⎿181

IF (STATION<Z> IS EMPTY)
IF (STATION<Z> IS USABLE FOR<Y>)
THEN(USABLE FOR JOB PROCESSING OF <Y>)

IF (WORKPIECE <X> IS IN QUEUE)
IF (JOB OF WORKPIECE <X> IS<Y>)
IF (USABLE FOR JOB PROCESSING OF<Y>)
THEN( WORKPIECE <X> ASSIGNABLE)

IF ( WORKPIECE <X> ASSIGNABLE)
THEN<MIN.X>(ASSIGNING OF THE LOWER NUMBERED WORKPIECE <X>)

(ASSIGNING OF THE LOWER NUMBERED WORKPIECE <X>)

FACILITIES CONTROL METHOD

BACKGROUND OF THE INVENTION

1. Field of the Invention

The present invention relates to computer control of a system consisting of a plurality of facilities, such as an automated factor. More particularly, it relates to a facilities control method (hereinbelow, called "condition discriminative process") wherein the status of each of respective facilities is received, conditions are analyzed in accordance with predetermined control logic functions and, when the conditions have been satisfied, operation commands based upon the control logic functions are issued to the respective facilities.

2. Description of the Prior Art

In general, the aforementioned condition discriminative control process employs a system wherein control logic functions for analyzing conditions and generating control commands are programmed by the use of a general-purpose language, such as assembler language, and are executed in a control apparatus. In this case, the design of software, including the study of a program table as well as a program processing system, is carried out separately from the study of the control logic functions themselves. Herein consideration software development is required for realizing the control logic functions devices by a control engineer to yield an error-free program, and there is the problem that special personnel for carrying out the programming are required. In addition, documents (specifications, design drawings, etc) are required for the maintenance of the program. A further problem is that, even when these documents are utilized, the program cannot be effectively modified by an unskilled person.

For saving the labor required for program development, a decision table which contains control logic operations are complicated, the number of conditions to be employed in the decision table becomes large, and it is very difficult to take a survey of all available logic and arrange the condition entries so as to accurately realize the control logic functions. Further, in changing the control logic functions, it is next to impossible to read the present control logic functions from the contents of the table and amend them appropriately. There is also a format in which a condition entry or action entry is describable in natural language so as to enhance the understanding of the control logic function, as described in an article by E. H. Mamdani entitled "A Fuzzy Rule-Based Method of Controlling Dynamic Process", Proceedings of the 20th IEEE Conf. on Decision and Control, pp. 1098–1103, DecEMBER 1981. In this case, however, the method of expressing the control logic function is similar to that of the decision table, and all necessary conditions must be arranged and provided for individual actions. Accordingly, it is difficult to describe and change complicated control logic functions.

SUMMARY OF THE INVENTION

An object of the present invention is to provide a facilities control method which can perform condition discriminative control without program development, a control engineer himself/herself describing control logic functions with data, which the control logic functions can be readily described and changed.

In order to accomplish this object, the present invention comprises a facilities control method employed by an apparatus for controlling a plurality of facilities, so as to perform jobs. It is characterized by a rule memory portion which stores rules, each rule consisting of a conditional part descriptive of at least one condition to be determined and a conclusive part descriptive of an operation to be executed or estimated when the condition is satisfied. A rule applying portion compares information representative of the condition of the facilities, information of the job (or task) to be performed by the facilities and a status concluded by the rule. conditional parts of the rules are stored in the rule memory portion. The contents of the conclusive part of the rule having satisfied the condition are updated as a result of the comparisons. Control instructions for the facilities are decided by combining the rules in correspondence with the status of each of the facilities.

BRIEF DESCRIPTION OF THE DRAWINGS

FIG. 3 is a diagram showing an example of control logic functions for IF-THEN rules;

FIG. 6 is a detailed diagram of an input/output signal—character string information memory part;

FIG. 7 is a detailed diagram of an IF-THEN rule trigger even memory part;

FIG. 8 is a detailed diagram of an IF-THEN rule memory part;

FIG. 9 is a detailed diagram of a character string memory part;

FIGS. 14A and 14B (combined as shown in FIG. 14) depict an operating flow chart of a control part for determining a control command character string;

FIG. 18 is a diagram showing IF-THEN rules which are modified for an example of the production system (in FIG. 17).

DETAILED DESCRIPTION

Before beginning the description, IF-THEN rules and principles for determining conditions and determining control commands on the basis of the rules will be described.

Figure 1:
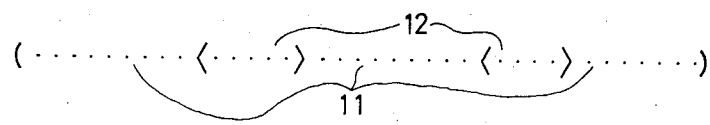
FIG. 1 is an explanatory diagram of an IF-THEN rule for use in the present invention.

An IF-THEN rule is a condition - conclusion pair consisting of a plurality of character strings which are divided into a conditional part (IF part) descriptive of conditions to be analyzed and a conclusive part (THEN part) descriptive of contents to be executed when the conditions are fulfilled. The plurality of conditions described in the IF part are handled as a logical "and" operator. In the THEN part, the conclusion which results from the fulfillment of the conditions of the IF part is described. Conditions of a logical "or" operator can be expressed as a plurality of IF-THEN rules which have the same THEN parts and different IF parts. Basically, a control block performs pattern matching between the character string of the IF part of the rule and each of character strings stored in a work table within a memory block. In the presence of a matched character string in the work table, it additionally writes the character string of the THEN part into the work table. The format of the character strings constituting the IF part and THEN part, and the forms of the IF-THEN rules are shown in FIG. 1. The character strings, enclosed with "(" and ")", consist of fixed parts 11 for clearly indicating the significance of each of the conditions and conclusions and parameter parts 12 (each being marked off by "<" and ">") for describing constants or variables indicative of facilities etc. to which the conditions and conclusion apply. Here, . . . signifies any desired character string, and ʃ signifies that a plurality of items can be designated. The IF part is a character string which begins with "IF", and which consists of characters between "(" first appearing next "IF" and ")" corresponding to the "(". Where a plurality of conditions (character strings) are described in the IF part, "IF's (any desired character strings)" are continuously designated for the plurality. The IF part of one rule continues to apply until "THEN" appears next. The THEN part is a character string which begins with "THEN", and which consists of characters between "(" first appearing next "THEN" and ")" corresponding to the "(". Where a plurality of conclusions (character strings) are described in the THEN part, "THEN's (any desired character strings)" are continuously designated for the plurality. The IF-THEN rules include three forms, as follows. In some systems for realizing a control block, the number of characters and parameter parts which can be described in one character string are limited, but this does not pertain to the essence of the present invention. Hereinbelow, the characters and parameter parts are assumed to be usable at will. Further, characters actually usable are limited depending upon processing systems, but this does not pertain to the essence of the present invention. Hereinbelow, character strings including Chinese characters shall be used for ease of understanding.

Rule of Form 1:

This is a rule in which only constants (facility numbers, job names, etc.) are described in the parameter parts. This Rule Form employed for determining the usage of each of individual facilities, such that if facility number 1 is empty, it shall be used. In this form, the matching of character strings is determined as to all the parts (both the fixed and parameter parts) of the character string of the IF part. The character string to be additionally written in the work table is the very character string designated in the THEN part.

Rule of Form 2:

This is a rule in which variables (W, X, Y, Z, etc.) are contained in the parameter parts (parameter parts may be constants). This Rule Form is employed for determining usage as a general rule for the same types of facilities, such as all empty facilities. In this rule form, the matching of character strings is determined as to the parts of the character string of the IF part except the parameter part where a variable is designated. Next, in the entire matched character string in the work table, the parameter part of the character string in the work table corresponding to the parameter part of the character string of the IF part where the variable is designated is stored as the variable into a table within the memory block. The character string to be additionally written into the work table is such that the parameter parts of the character string of the THEN part where variables are designated are replaced with only those of the stored variable values meeting a logical "and" function of the IF part.

Rule of Form 3:

This is a rule in which, in addition to the feature of Form 2, a procedure name is designated in the THEN part in a manner to be enclosed in "<" and ">" first appearing subsequently to "THEN". It serves to put the processing operation, such as the selection of a maximum value and an operation on numerical values, into control logical functions. In this form, effectively the same processing step as in Form 2 is performed. The difference between Form 3 and Form 2 is that control shifts to the procedure designated immediately before the character string of the THEN part is generated. In this case, all the variable values which meet the logical "and" function of the IF part are delivered as subtrahends. The selection of a maximum value, an operation on numerical values, etc. are executed, and the delivered variable values are altered within the procedure, whereupon control can be restored. The character string to be generated is such that the altered variable values are inserted in the corresponding parameter parts of the THEN part.

Next, the principles of determining control commands will be described. In the present invention, the control block monitors signals representative of the status of each of the respective facilities. When a specified status (signal) has been generated (the status to apply rules can be appointed in advance, and a series of rules to be applied for each respective status can be distinctively assigned), the following processing operations are executed using the series of rules to be applied in correspondence with the particular status. First, the status of each of the facilities is converted into a character string, which is stored as an initial character string in the work table. Subsequently, pattern matching operations between the IF parts of the series of rules and the character string in the work table are performed, and new character strings are additionally written into the work table in succession in accordance with the processing of the IF-THEN rule described above. Further, pattern matching operations between IF parts of the series of rules and the character string in the work table including the character strings added anew are performed again, and even new character strings are added into the work table. Such operations are successively repeated, and a control command is finally obtained in the form of a character string. (The character string obtained is converted into external signals, which are supplied to the respective facilities.)

Now, an example of controlling a production system in FIG. 2 will be described in order to aid in understanding the IF-THEN rules as well as the principles of determining the conditions and generating a control command. In this system, a workpiece 22 is automatically fed from a workpiece feed line 21 and transferred to respective work stations 24 by a carrier 1 (23). The workpiece is subjected to such jobs as fabrication and assembly at the work stations, and a finished product is transferred to a product carrying-out line 26 by a carrier 2 (25) so as to be automatically carried out. It is assumed here that the work pieces to be fed are of two types, which need the job of assembly A and the job of fabrication-assembly B respectively. The expression "work station" is intended to mean a production facility which is constructed of a plurality of robots or/and machine tools. It is assumed that Station 1 is capable of performing both the job of the assembly A and the job of the fabrication-assembly B and is capable of processing the workpiece at a speed at least twice as fast as those in the other stations. It is also assumed that Stations 2 and 3 are capable of performing only the job of the assembly A and the job of the fabrication-assembly B, respectively.

Figure 2:
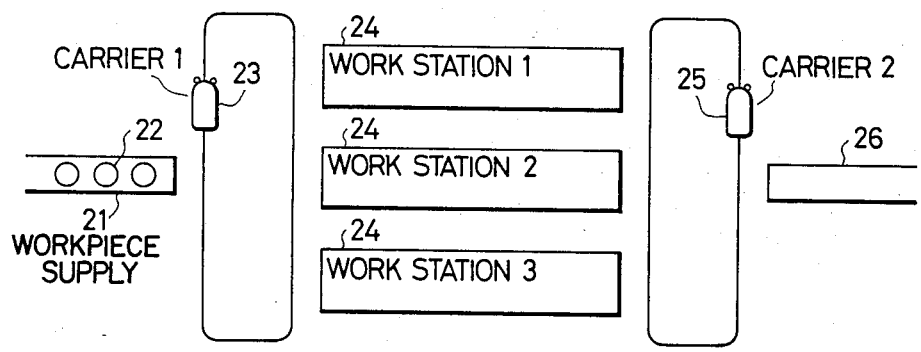
FIG. 2 is a diagram of one example of a control system of the present invention.

An example in which control logic function for controlling the production system in FIG. 2 are described by IF-THEN rules is illustrated in FIG. 3. The control logic operations are classified into two types: 1— job assignment, in which the fed workpiece is assigned to the stations; and 2— carrying out of the finished product in which the finished product is carried out or delivered. Each of the two types of control logic operations is described by the use of several IF-THEN rules. These rules describe the control logic operation based on the conditions that (1) the work pieces are assigned in the order in which they have been fed (no passing is allowed), (2) the station of a lower number (having a higher processing ability) is an upstream station, and (3) the products are carried out in the order in which they have been finished. In the course of job assignment, rule No. 1 decides the workpiece to be assigned. Rules No. 2 and No. 3 decide the station to which the particular workpiece is assigned. That is, the stations which have the function of executing a job on a particular workpiece, and which are empty are designated as alternatives by rule No. 2. Rule No. 3 chooses the lower numbered alternative. Further, rule No. 4 acknowledges the usability of the workpiece transport carrier and finally generates a control command. For product delivery, rules No. 5 and No. 6 select the workpiece to be carried out. That is, the finished workpieces are chosen by rule No. 5, and the lower numbered workpiece is selected as the workpiece to be carried out by Rule No. 6. Rule no. 7 acknowledges the usability of the product transport carrier and finally generates a control command.

Figure 4:
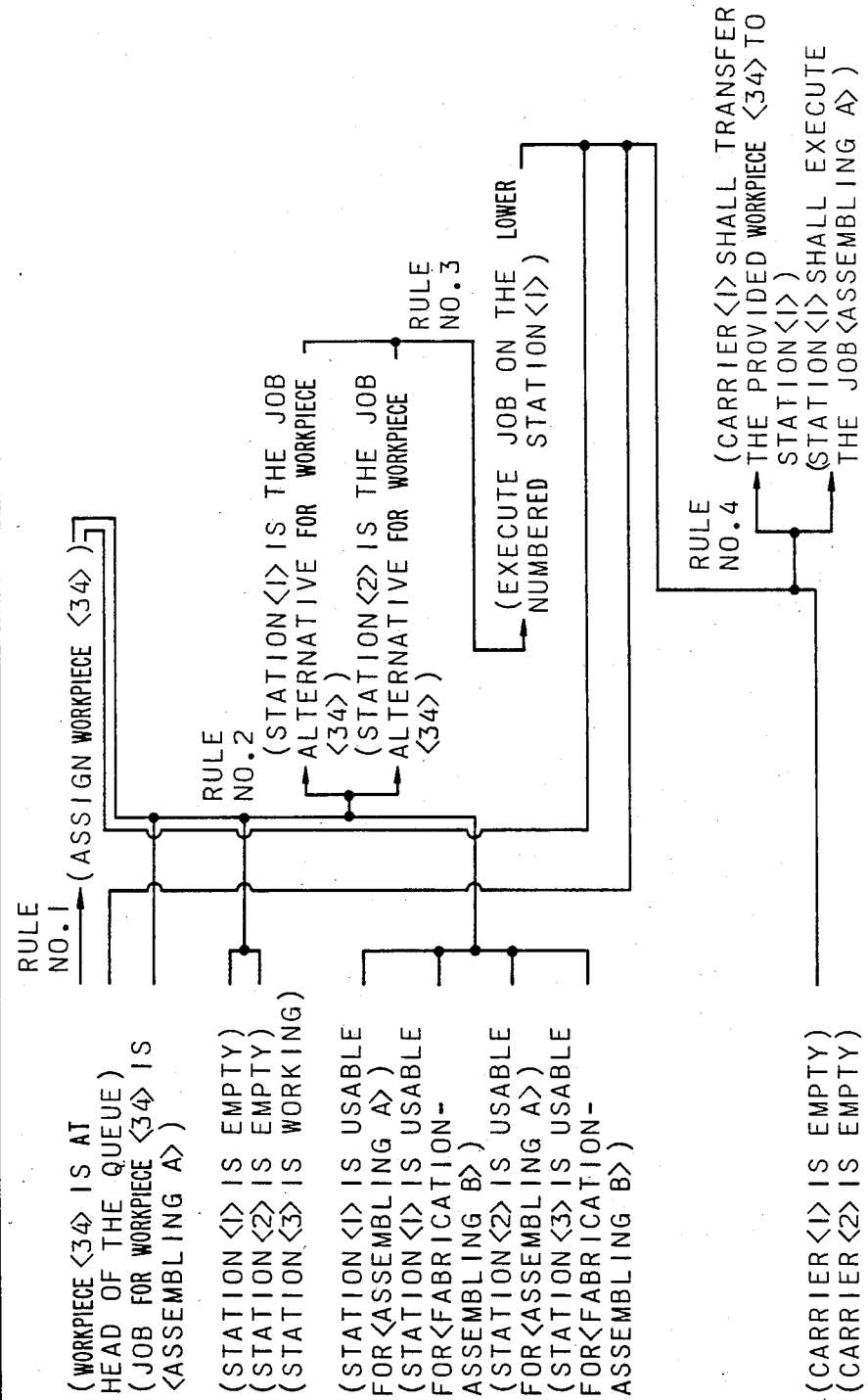
FIG. 4 is a diagram showing examples of character strings which are generated when control commands are determined on the basis of IF-THEN rules.

The process in which a control command is generated on the basis of the rules of job assignment in FIG. 3 is illustrated in FIG. 4. In this figure, character strings stored in the work table are indicated from left to right in the order in which they have been stored. The input status of each of the facilities, as converted into charcter strings, is shown on the left side of the figure. A generated control command is shown in the right side of the figure. First, a character string for assigning a workpiece <34> on the basis of rule No. 1 in FIG. 3 is loaded into the work table. Subsequently, rule No. 2 determines the conditions of empty status, executable job etc., of each of the stations <1> and <2> are job alternatives. Further, rule No. 3 selects the lower numbered station <1>. Lastly, control commands are determined on the basis of rule No. 4. (The control block thereafter converts the character strings of the control command into signals and transmits them to respective facilities.)

In order to realize the above operations, the control block has the function of monitoring the status of each of the facilities and selecting a series of rules to be used upon the occurrence of a certain status. It also converts the status of each of the facilities into a character string and generates a control command on the basis of rules. Further, the control block converts the generated control command into signals and transits them to the corresponding facilities.

Hereinbelow, the contents of the present invention will be described in detail.

Figure 5:
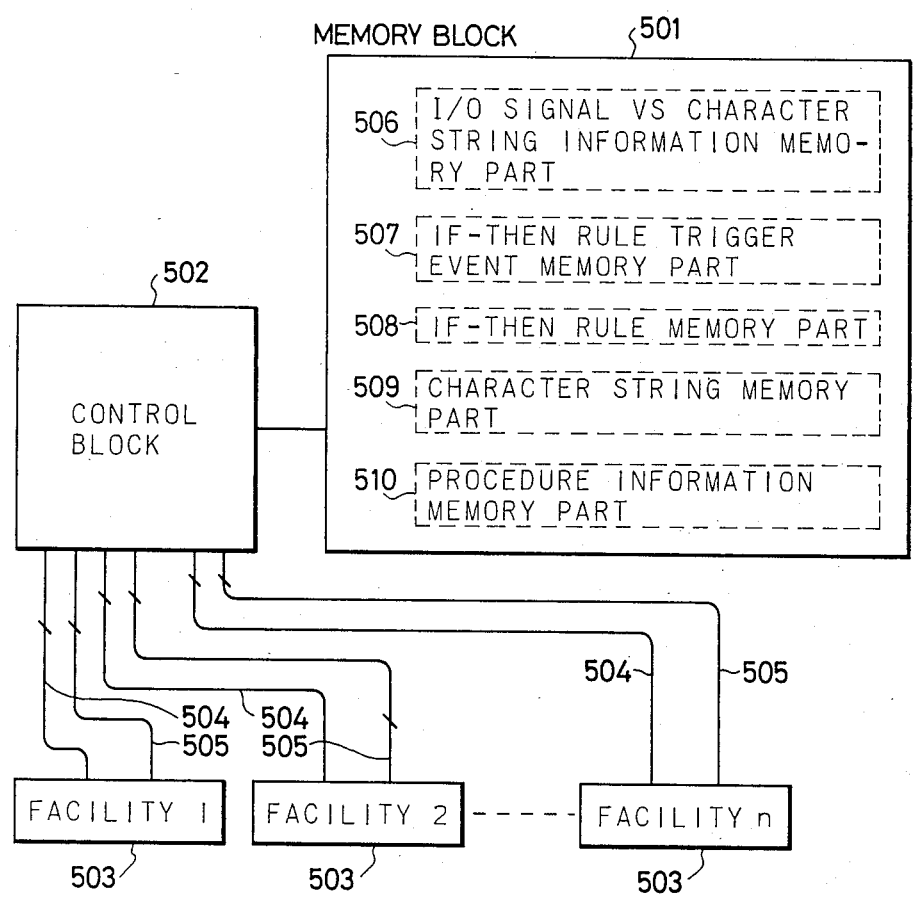
FIG. 5 is a block diagram of the present invention.

FIG. 5 is a block diagram shown in embodiment of the present invention. The present embodiment comprises a memory block 501, a control block 502, a plurality of facilities 503, status signal lines 504 and control signal lines 505. Further, the memory block 501 comprises an input/output signal versus character string information memory part 506, an IF-THEN rule trigger event memory part 507, an IF-THEN rule memory part 508, a character string memory part 509 and a procedure information memory part 510. The memory block 501 stores data representative of IF-THEN rules, a correspondence table of external signals and internal character strings, etc. The control block 502 receives status signals representative of the status of each of the facilities 503 (lines 504) and generating control command signals and sends the command signal to the respective facilities (lines 505) on the basis of the data of the memory block 501.

FIG. 6 shows the details of the I/O signal vs. character string information memory part 506. This memory part stores information for the interfaces between the external signals (lines 504, 505 in FIG. 5) and internal processing. In FIG. 6, an input signal - character string correspondence table 61 stores data for converting the status signals (lines 504 in FIG. 5) into the form of a character sting to be handled in the control block 502. This table consists of a status signal line entry for storing the entry addresses of the status signal lines 504, and facility status character strings for storing character strings representative of facility status corresponding to signals on the signal lines. On the basis of the data in this table, control block 502 reads the respective status signal lines 504 and generates corresponding character strings subject to the occurrences of the signals (corresponding to the status of each of the facilities converted into character strings in FIG. 4). The generated character strings are stored in the character string memory part 509. Here, where the information of the status signal line 504 is binary information ("on" or "off"), control block 502 generates the character string stored in the table, as is (for example, address B or C in FIG. 6). Where the information on the status signal line 504 is numerical information (such as the read information of a bar code or the like), the control block generates a character string with the information written as a value in that parameter part of the character string stored in the table in which a variable (W, X, Y, Z) is designated (for example, address A or D in FIG. 6). That is, in the example of FIG. 6, where numerical information 34 is present in status signal line address A, control block 502 generates the character string (workpiece <34> is at the head of a queue). In FIG. 6, a character string - output signal correspondence table 64 stores data for sending command signals (lines 505) to the facilities 503 on the basis of character strings representative of control commands generated by the control block 502 (corresponding to control commands obtained as the character strings in FIG. 4, and stored in the character string memory part 509). This table consists of control command character strings for storing the character strings representative of the control commands, and a command signal line entry for storing entry addresses of the command signal lines 505 to which the command signal are to be sent when the control commands have been generated by the control block 502. Where control block 502 has compared the character string representative of the generated control command and the character string designated in this table, it generates the signals for the command signal lines 505 corresponding to the particular character string. At this time, where variables ((W, X, Y, Z) are designated in the parameter parts in the character string designated in the table, the values of the parameter parts corresponding to the variables in the character string representative of the generated control command are transmitted over the signal lines. For example, where a character string representative of the generated control command is (carrier <1> shall transfer provided workpiece <34> to station <1>), the values 34 and 1 are coupled to signal line address E in this order, to instruct the carrier 1 to transfer the workpiece 34 to the station 1. Meanwhile, where no variable is designated in the parameter parts of the character string, a binary signal ("on" or "off") is delivered to the corresponding signal line address (for example, address F in FIG. 6).

FIG. 7 shows the details of the IF-THEN rule trigger event memory part 507. This memory part stores information for designating a series of rule sets to be triggered (to be used for the control block 502 to generate the control command), the rule sets being determined depending upon the status of each of the facilities). By way of example, the control logic operations for controlling the production system of FIG. 2 have been divided into two rule sets as indicated in FIG. 3. Here, the rule set of job assignment must be triggered for a determination of conditions and the decisions of control commands when the workpiece has been fed to the head of the workpiece providing line 21 in FIG. 2, when any work station 24 has become available (empty), or when the carrier 1 (23) has become available (empty). Likewise, the rule set for product delivering needs to be triggered for a determination of conditions and the decisions of control commands when the job has been completed in any work station 24 or when the carrier 2 (25) has become available (empty). Where the facilities do not have these statuses, control block 502 need not generate a control command. In this manner, the rule sets to be triggered are determined for the respective status of each of the facilities (there are some facility statuses which do not require the triggering or file sets, such as station <1> being in operation and carrier <2> transporting). In FIG. 7, a rule set trigger condition table 71 stores the names of rules sets to be triggered for the respective status of each of the facilities. This table consists of a status signal line entry for storing the entry addresses of status signal lines 504 representative of facility status to execute rule triggering, and trigger rule set names for designating the names of rule sets to be triggered upon the occurrence of the signals on the signal lines (status signal lines 504 addresses corresponding to facility status which need not trigger rule sets are not appointed in this table). A used rule set name area 72 stores the name of a rule set to be used for the decision of a control command by the control block 502. The control block 502 polls the respective status signal lines 504 on the basis of data of the rule set trigger condition table 71. When a signal has been generated, it stores the trigger rule set name corresponding to the signal line into the used rule set name area 72 and then shifts to the next processing step.

FIG. 8 shows the details of the IF-THEN rule memory part 508. This memory part is a part which stores information on IF-THEN rules descriptive of control logic operations. The IF-THEN rules are stored distinctively for the respective rule sets. A rule set directory 81 stores information indicating the positions of the respective rule sets on a rule table 82 which stores the IF-THEN rules. This directory consists of rule set names for storing the names of the respective rule sets, and rule set head positions and rule set last positions for indicating the head positions and last positions on the rule table in which the rule sets are stored, respectively (the rules are stored with each rule extending from the rule set head position to the rule set last position). In the rule table 82, each rule is stored in such a manner than an IF part character string and a THEN part character string are distinguishable. Here, rule types are information for distinguishing rules to finally generate control commands from the other rules. The rule to finally generate control commands are indicated by "1", and the others by "0". The information serves to determine which character string is the obtained control command when the control block 502 generates the control command.

FIG. 9 shows the details of the character string memory part 509. This memory part is a part which stores character string information, such as character strings produced in the process of determining control commands as illustrated in FIG. 4 and character strings representative of the value of variables received when IF-THEN rules containing the variables as the rules of Forms 2 and 3 are processed. A character string storing table 91 stores character strings which are successively produced when the control block 502 generates control commands. Here, character strings representative of the control commands finally obtained are stored in a control command character string table 93 (the control block 502 executes such processing on the basis of the rule types in FIG. 8). By way of example, character strings other than the control commands obtained as the character strings in FIG. 4 are stored in the character string storing table 91, while the control commands obtained as the character strings are stored in the control command character string table 93. It is sometimes desirable to fixedly store specified character strings in the character string storing table 91 beforehand. To this end, a fixed-part last position area 92 is provided. This area stores the last position of the fixed character strings in the character string storing table 91. The control block 502 first erases a part below this position, and then uses it for storing the character strings. Examples of specified character strings desired to be fixedly stored are the character strings in FIG. 4 from (station <1> is usable for <assembly A>) to (station <3> is usable for <fabrication-assembly B>). These can be said to represent fixed conditions such as the functions of the stations, rather than to represent the status of each of the stations changing every moment. It is more natural to store such conditions as fixed conditions in advance, than to receive them as external signals each time. In FIG. 9, a value-of-variable temporary table 94 and an "and" logic (operation) met (or satisfied) value-of-variable table 95 serve to realize the operations of the IF-THEN rules of Forms 2 and 3. The value-of-variable temporary table 94 is a table in which, in the pattern matching between the character string of a certain one of IF part and the character strings of the work table (the character string storing table 91), the value of the parameter part of the character string in the work table, matched with the character string of the IF part (determined in the portion of the character string except the parameter part where a variable is designated), the value being received as the value of the corresponding variable of the character string of the IF part, is stored. Further, an "and" logic (operation) met value-of-variable table 95 stores those of the received variable values which satisfy the "and" logic operation of the IF part.

Figure 10:
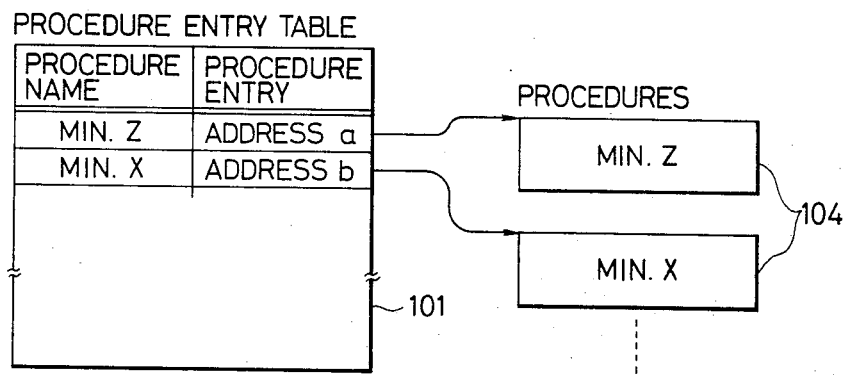
FIG. 10 is a detailed diagram of a procedure information memory part.

FIG. 10 shows details of the procedure information memory part 510. This memory part stores the procedures designated to the IF-THEN rules of Form 3 and the entry addresses thereof. A procedure entry table 101 consists of a procedure name for storing the name of each procedure, and a procedure entry for storing the entry addresses of the procedure. Repsective procedures 104 are stored in the corresponding entry addresses.

Figure 11:
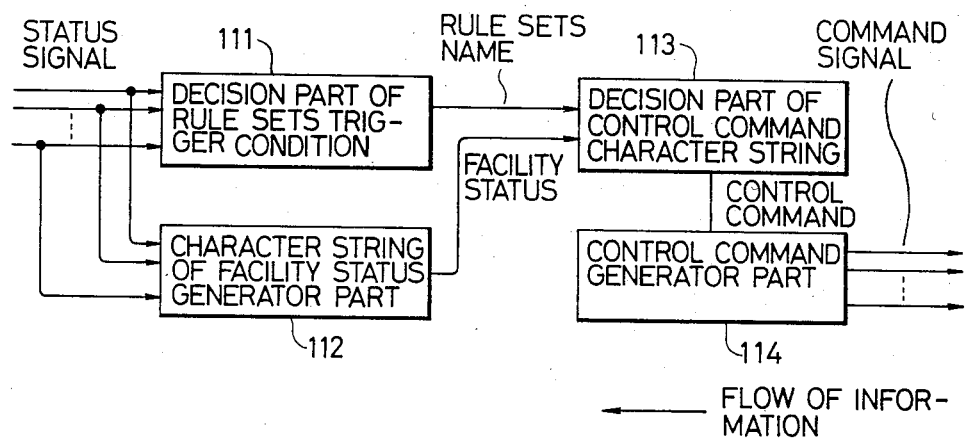
FIG. 11 is a functional block diagram of a control block.
Figure 12:
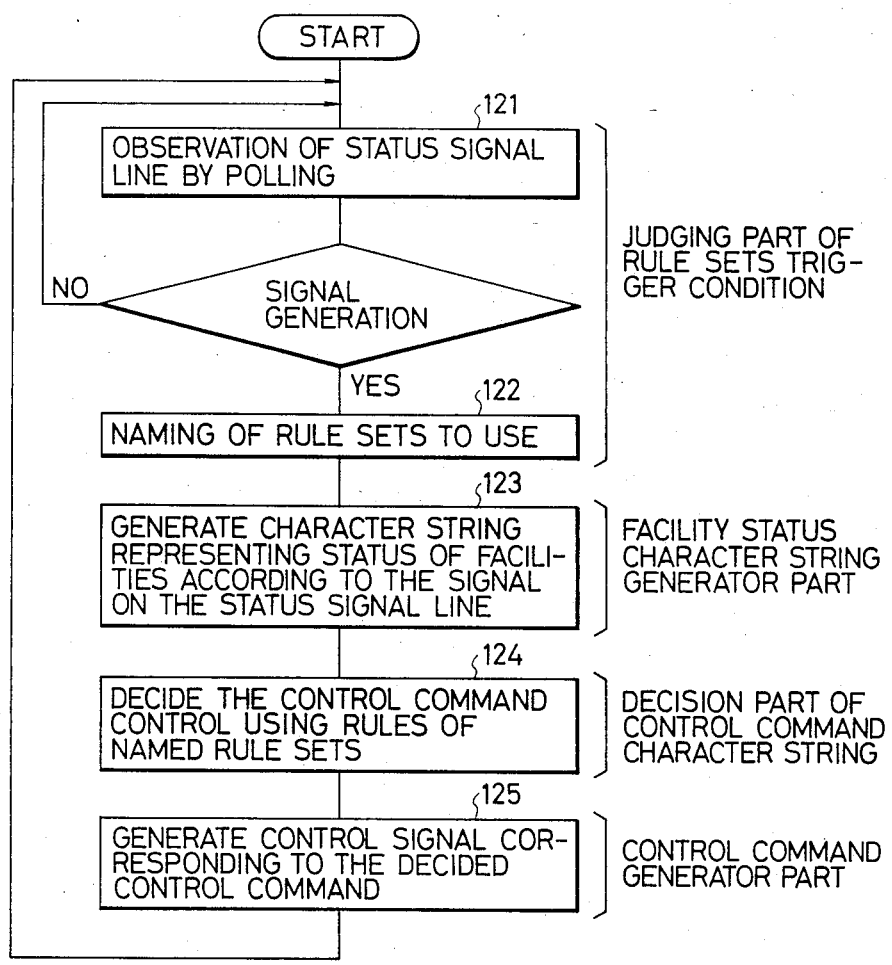
FIG. 12 is an operating flow chart of a control block.

FIG. 11 shows a functional block diagram of an embodiment of the control block 502. The present embodiment comprises a part for determining a rule set trigger condition 111, a part for determining a rule set trigger condition 111, a part for generating the character string of a facility status 112, a part for determining the character string of a control command 113, and a part for generating a control command 114. FIG. 12 shows the operating low of the control block 502. Referring now to FIGS. 6 to 12, the operating flow of the control block 502 will be described. When the control block 502 has started operating, polling of the status signal lines 504 is first started by the rule set trigger condition determining part 111. More specifically, the rule set trigger condition determining part 111 successively reads the signal lines of the status signal line entry stored in the rule set trigger condition table 71, to check if a signal has been generated (box 121). When no signal is generated, the successive reads are continued cyclically. When a signal is generated, a trigger rule set name corresponding with the signal line is set in the used rule set name area 72, to trigger the facility-status character string generator part 112 (box 122). First, the facility-status character string generator part 112 erases the portion of the character string storing table 91 below the last position of fixed parts (set in the fixed-part last position area 92). Next, it successively reads the signal lines of the status signal line entry stored in the input signal - character string correspondence table 61, to generate the facility-status character strings corresponding to the signal lines bearing signals (as to the details of the generation of the character strings, refer to the foregoing description of FIG. 6) and to successively store them in the portion of the character string storing table 91 below the fixed-part last position (set in the fixed-part last position area 92), whereupon the control command character string determining part 113 is triggered (box 123). The control command character string determining part 113 erases the control command character string table 93 and stores thereinto a character string finally representative of a control command through a procedure to be described later (unless the status of the facilities meets the conditions of the control logic described by the IF-THEN rule, nothing shall be stored in the control command character string table 93), whereupon the control command generator part 114 is triggered (box 124). The control command generator part 114 examines if the control command character string is stored in the control command character string table 93. When nothing is stored, the operating flow returns to the rule set trigger condition deciding part 111. When a control command character string is stored, it is compared with the control command character string stored in the character string - output signal correspondence table 64. When they have matched, signals are generated for the corresponding signal lines of the command signal line entry (as to the details of the generation of the signals, refer to the foregoing description of FIG. 6). After signal generation has been performed as described above in correspondence with all the character strings stored in the control command character string table 93, the operating flow returns to the rule set trigger condition judging part 111 (the above, box 125), and the polling is started again (box 121).

Figure 13:
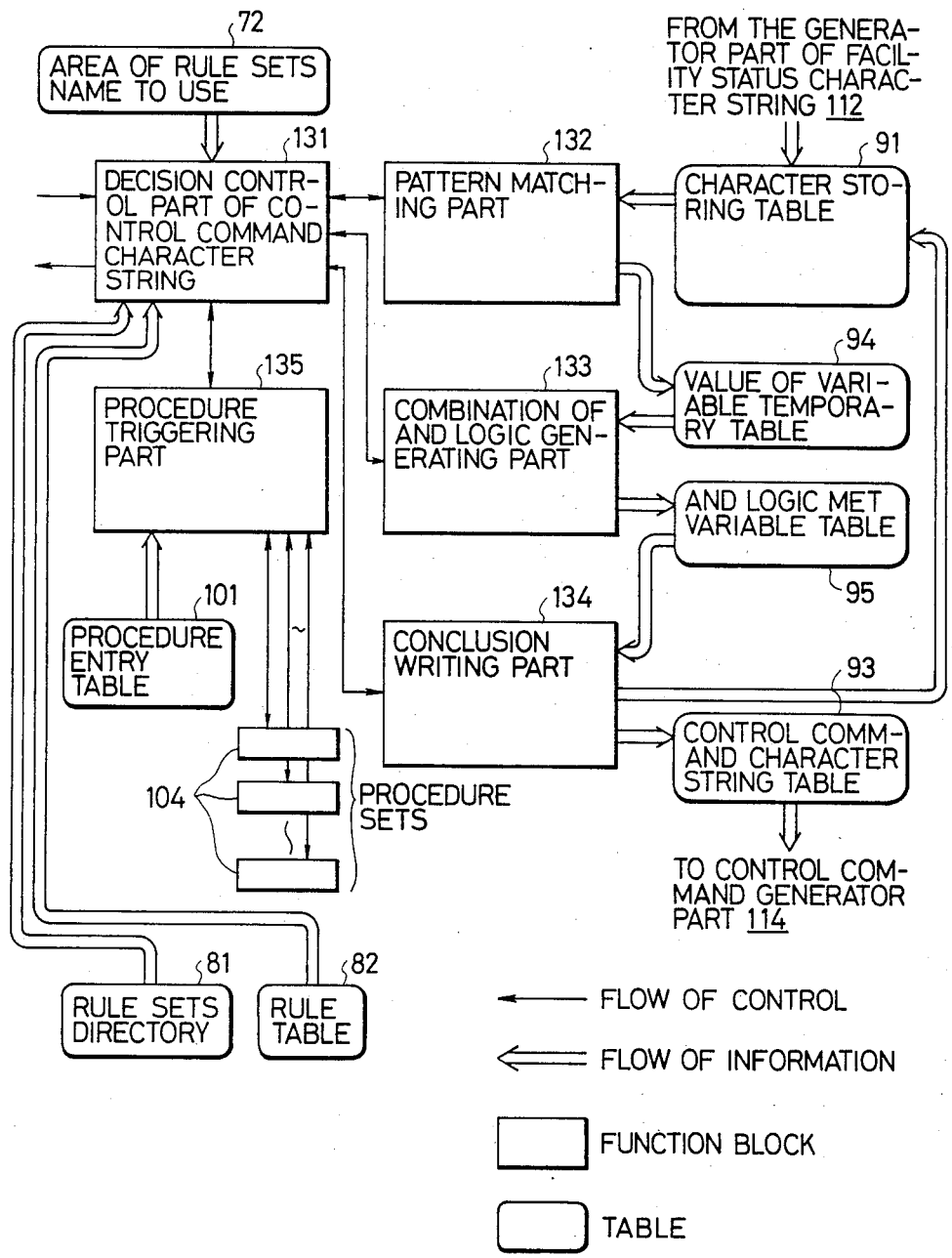
FIG. 13 is a diagram shown relationships between various tables and functional blocks in a control command character string deciding part.
Figure 14B:
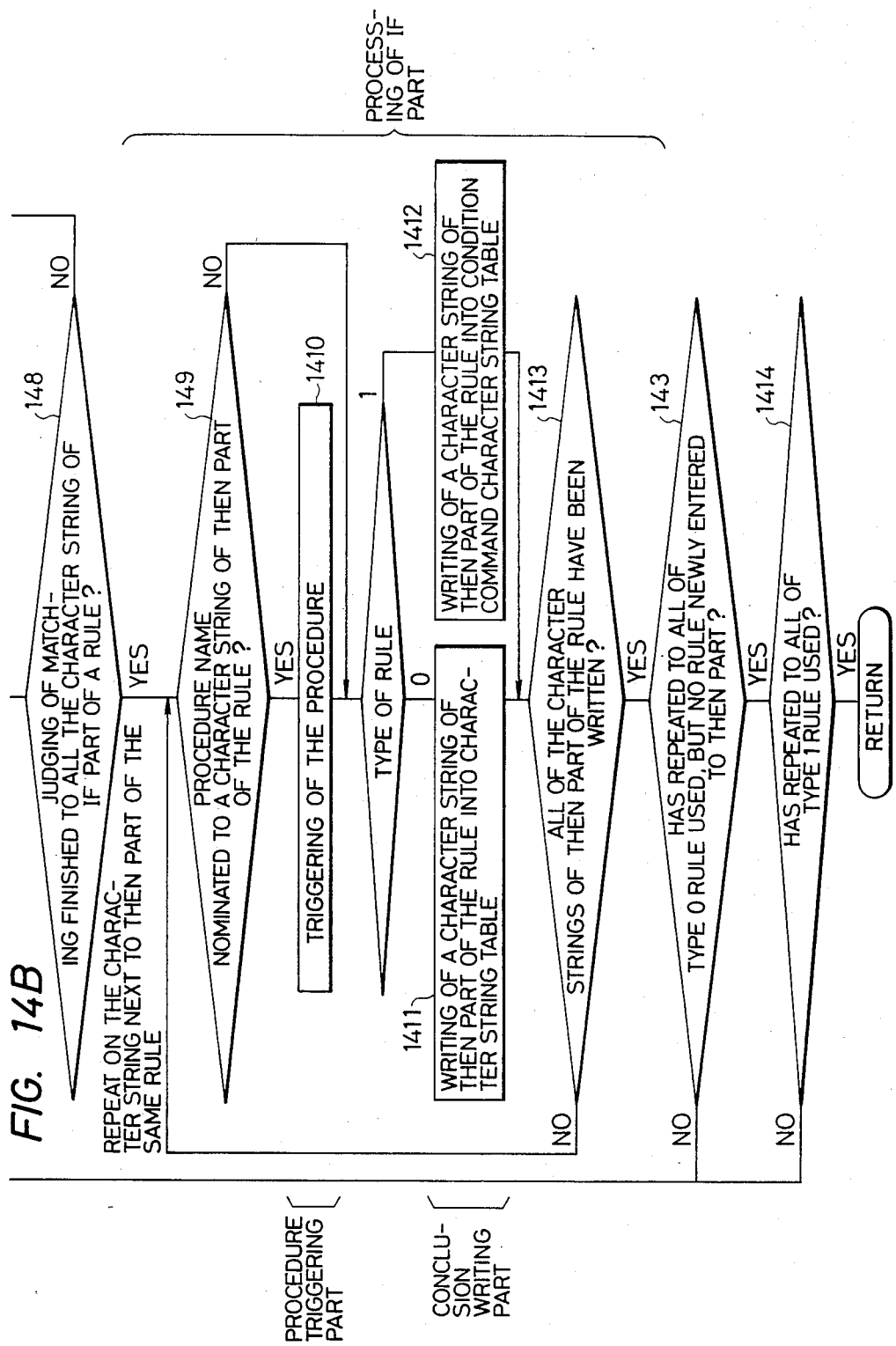

FIG. 13 is a diagram shown relationships between the aforementioned tables and functional blocks in the control command character string deciding part 113. The control command character string deciding part 113 consists of a control part 131 for deciding the control command character string, a pattern matching part 132, a combination of "and" logic-generating part 133, a conclusion writing part 134 and a procedure triggering part 135. When the control command character string deciding part 113 has been triggered, the control command character string decision controlling part 131 is first triggered. Using the other functional modules, the control command character string decision controlling part 131 generates character strings successively, as exemplified in FIG. 4, to finally store the control command character string into the control command character string table 93. FIG. 14 shows the operating flow of the control command character string decision controlling part 131. Hereunder, the operations will be described. When the control command character string decision controlling part 131 has been triggered, it first erases the control command character string table 93 (box 141), and then finds out from within the rule set directory 81 the same rule set name as the rule set name set in the used rule set name area 72 and obtains the head and last positions of rules to be used (box 142). Subsequent processing is executed for only the rules between the head and last positions. Next, the control command character string decision controlling part 131 repeats the following processing steps for each of the rules until as to all the rules of the rule type 0 within the rule table 82, there is no longer any rule to have the character string of the THEN part written into the character string storing table 91 anew (box 143). When such a rule does not exist, the following processing step is further repeated for each of the rules of the rule type 1 within the rule table 82 (box 1414), whereupon the control command generator part 114 is triggered. The control command character string decision controlling part 131 takes out a certain rule and executes processing for each of character strings appointed in the IF part of the rule. First, the pattern matching part 132 is triggered to compare one character string of the IF part of the certain rule with a character string stored in the character string storing table 91 (box 143). The pattern matching part 132 makes a matching decision as to all the stored character strings from the head of the character string storing table 91. Regarding the matching decision, where no variable is designated in the parameter part 12 of the character string (rule of Form 1), the fixed part 11 is compared with the parameter part 12 of the character string. In addition, where a variable is designated in the parameter part 12 of the character string (rule of Form 2 or 3), a matching decision is made for the part except the parameter part or parts of the variable appointment. When the character strings have matched, the parameter part 12 of the character string (the character string stored in the character string storing table 91) is stored into the value-of-variable temporary table 94 as the value of the variable appointed in the corresponding parameter part 12 of one character string of the IF part now in accordance with the matching decision. In this case, each time the character string whose fixed part 21 matches has been found in the character string storing table 91, the variable value is received, and such variable values are successively stored into the respective rows of the variable-value temporary table 94. Where, as the result of the above, there is no matching character string, the next rule is extracted, and the pattern matching operation is started again (box 144). In the presence of any character string having matched, if one character string of the IF part having now been subjected to the matching judgement contains a variable in the parameter part 12, the combination-of-"and" logic generating part 133 is triggered (box 145), and the combination of variable values satisfying the "and" logic operation of the IF part is generated by a procedure to be described below (box 146). The combined result is stored into the "and" logic satisfied value-of-variable table 95. Here, where the combination of the variable values satisfying the "and" logic operation does not exist, the rule being used is discarded, and the next rule is extracted to restart pattern matching (box 147). If one character string of the IF part now subjected to the matching operation does not contain any variable in the parameter part 12, the above processing step is not performed (box 145). After the processing step thusfar described has been executed for all the character string appointed in the IF part of the certain rule, the next processing step is performed (box 148). First, one character of the THEN part of the rule being processed is extracted and it is determined whether or not a procedure name has been designated to the character string (box 149). In the presence of a procedure name, the procedure triggering part 135 is started, to trigger the designated procedure (box 149). In the absence of the procedure name, the procedure triggering part 135 is not started (box 149). The procedure triggering part 135 retrieves the entry address of the procedure name designated to the character string from the procedure entry table 101 and triggers the procedure of the address. Within the procedure, the values of the "and" logic satisfied value-of-variable table 95 can be changed at will (the above, box 1410). Next, the type of the rule being processed (rule type within the rule table 82) is examined. When the type is 0, one character string of the THEN part of the rule being processed is stored in the character string storing table 91 (it is stored at a vacant location next to the part where the character string have been stored before) (box 1411). When the type is 1 (rules to decide control commands), one character string of the THEN part of the rule being processed is stored into the control command character string table 93 (box 1412). The above operation is repeated for all the character strings of the THEN part (box 1413). The storage of the character strings of the THEN part is performed by triggering the conclusion writing part 134. The conclusion writing part 134 does not write a character string anew where the character string of the THEN part to be written is already stored in the character string storing table 93. In writing the character string of the THEN part, when no variable is designated in the parameter part 12 of the character string (rule of Form 1), the character string is written as is. when it is appointed, the values of respective variables stored in the "and" logic operation satisfied value-of-variable table 95 are incorporated into the corresponding variables of the parameter parts 12 of the character string of the THEN part to be written, whereupon the character string is written. This processing step is repeated for all the variable values stored in the "and" logic operation satisfied value-of-variable table 95.

Figure 15:
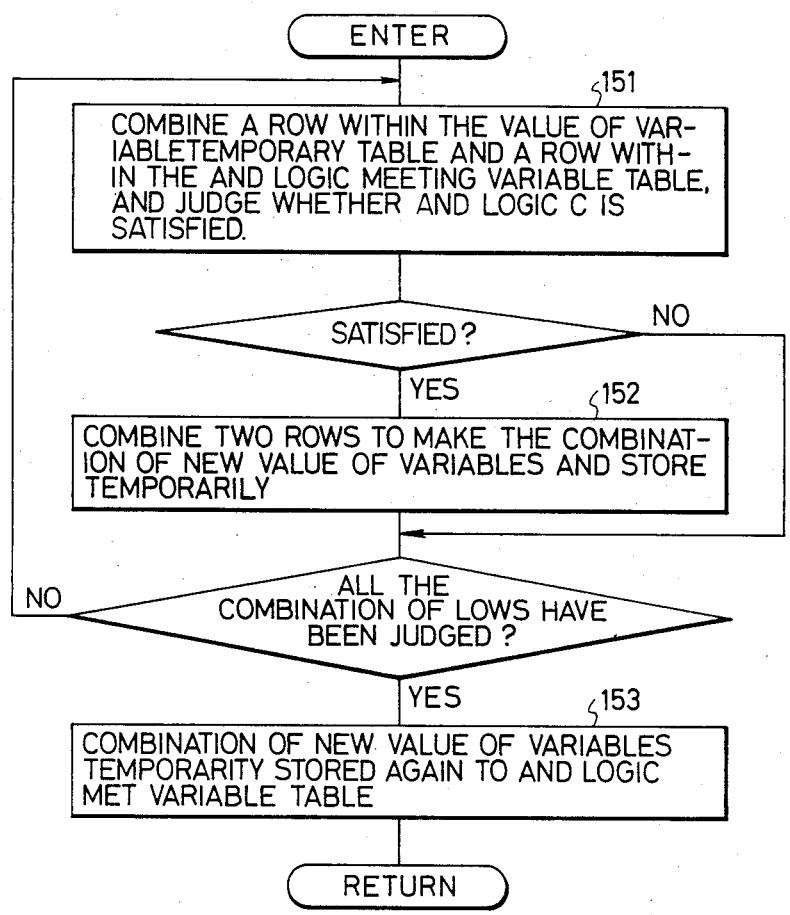
FIG. 15 is an operating flow chart of an "and" logic combination generating part.
Figure 16:
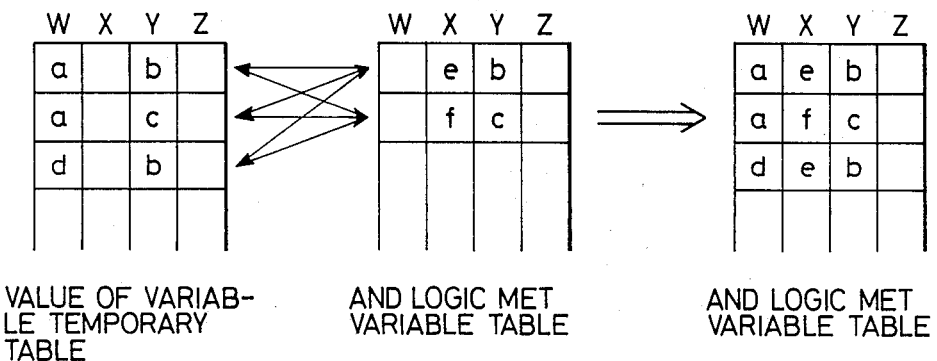
FIG. 16 is a diagram shown an example of the combination of variables satisfying an "and" logic operator produced by the "and" logic combination generating part.

The operating flow of the "and" logic combination generating part 133 is shown in FIG. 15. The "and" logic combination generating part 133 combines the value of a variable received anew by pattern matching between one character string of the IF part with the character string table 93 (stored in the value-of-variable temporary table 94) and a variable value satisfying the "and" logic operation as to the character string of the IF part having been subjected to the pattern matching processing before (stored in the "and" logic operation satisfied variable table 95), to make a variable value satisfying the "and" logic operation anew (which is stored in the "and" logic operation satisfies variable table 95 again). More specifically, as illustrated in FIG. 15, whether the "and" logic condition is satisfied is determined for all combinations of the respective rows of the value-of-variable temporary table 94 with those of the "and" logic operation satisfied variable table 95 (box 151). When it is satisfied, the combination of variable values is formed anew and stored temporarily (box 152). Lastly, the new combination of the variable values temporarily stored is stored in the "and" logic operation satisfied variable table 95 again (box 153). Where the "and" logic function is satisfied as a case where, between a certain row on the side of the variable value temporary table 94 and a certain row on the side of the "and" logic operation satisfied variable table 95, the variable values of the same variable name agree or either variable value is blank. A combination of the new variable values is formed in such a way that, in one set of variable values satisfied the "and" logic function, a variable whose values agree is rendered the agreeing value, while a variable whose either value is blank becomes a variable value not blank. FIG. 16 shows an example of formation of the "and" logic function satisfied variable combination. In this illustrative example, the values W=a, X=blank, y=b and z=blank of the first row of the value-of-variable temporary table and the values W=blank, X=e, Y=b and Z=blank of the first row of the "and" logic function satisfied variable table fulfill the "and" logic function and W=a, X=e, Y=b and Z=blank are formed anew (the first row of the "and" logic function satisfied variable table at the right end).

Figure 17:
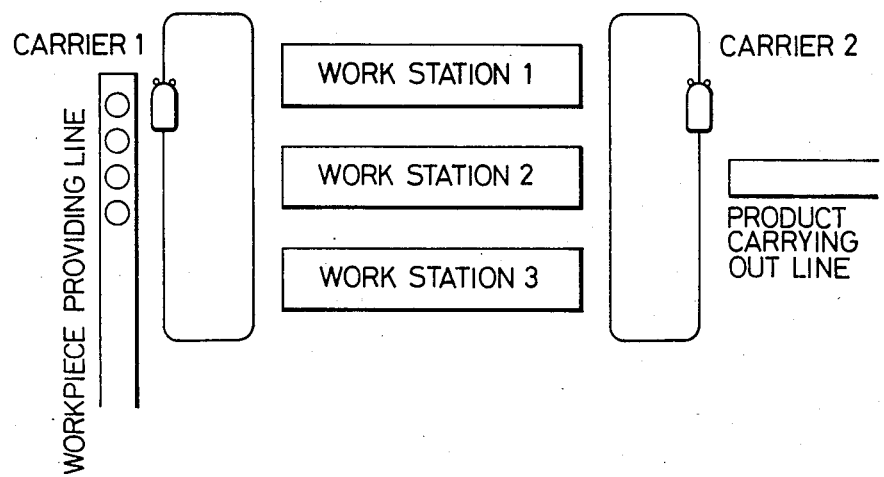
FIG. 17 is a diagram showing a modified example of the production system in FIG. 2.

As stated above, with the present embodiment, various control logic operations can be readily described by the use of natural language as shown in FIG. 3, so that condition discriminative control can be performed easily merely by storing rules in tables of the memory block 501. Further, modifications of the control logic attendant upon a change of a controlled system, a change of an operating system, etc. can be readily handled. For example, in order to permit the production system of FIG. 2 to process a succeeding workpiece earlier if any station is usable, it is remodeled so that the carrier 1 (23) can access, not only the head workpiece, but also succeeding workpieces on the workpiece providing line 21, the workpiece being allowed to pass (FIG. 17). In this case, as illustrated in FIG. 18, the control logic operations can be expressed easily merely by modifying some of the rules of job assignment of FIG. 3. That is, it is only necessary to modify rule No. 1 selecting the assigned workpiece, into modified rule 181, and to consequently partially change the IF parts of rules No. 2 and No. 4. With the modified rule, it is first determined if the job of handling workpieces can be executed in any station. Only the workpieces which can be put into the job are subsequently selected, and the one which is provided earliest (having the lowest number) is selected. In the present embodiment, modifications attendant upon the above alternations of the control logic function are ony the change to the table data of the memory block 501. Condition discriminative control based modified control logic operations can be performed without any change of the program. Moreover, in the present embodiment, it is possible to observe with the rule set trigger condition table 71 only facility status requiring rule triggering (only signal line addresses corresponding to the facility status requiring observation may be designated). Useless polling of signal lines can be reduced, and the polling period per signal can be shortened. Further, owing to the rule set directory 81, sets of series of rules to be triggered upon the occurrence of certain facility status can be given names, and the rules can be stored in a manner to be classified for the respective names. Conjointly with the rule set trigger condition table, this makes it possible to use only the necessary rules upon the occurrence of a certain facility status and to avoid useless rules. In addition, the provision of fixed parts in the character string storing table 91 (indicated by the fixed-part last position area 92) obviates the need for receiving fixed conditions in the facilities from signal lines each time.

Instead of polling the status signal lines by means of the control block, an external interrupt may be used to trigger the series of operations of the control block. In this case, operation of the present control system can be realized in such a way than an interrupt factor is assigned to each respective facility status acting as a condition of rule triggering and names of rule sets to be triggered are designated for the respective factors. In addition, the priority levels of control command decisions can be afforded by providing interrupt levels in the rule set directory 81.

There is also a system wherein the character strings of IF parts and THEN parts are stored in a single table (they are separately stored in the rule table 82 in the embodiment). In this case, indices for distinguishing the IF parts and THEN parts (for example, "IF" and "THEN") becomes necessary.

In the example of FIG. 1, the workpieces have been assumed to be provided one by one. Where workpieces are stored in a component warehouse or the like and the carrier 1 retrieves them in accordance with a predetermined schedule, a control schedule can also be realized in the following way. A table for storing a job schedule is provided in the character string memory part 509. In this table, a predetermined job plan "job <No. 150> is the <arm assembly> job of product <robot A type>" is written as a character string beforehand. In accordance with the contents of this table, jobs to be next performed are successively written into the character string storing table 91, whereupon the job stations, carrier etc. are automatically assigned, as described in the embodiment, and the specified schedule control can be realized.

In such a case where the same rule is used twice in a plurality of rule sets, a system wherein all the addresses of rules to be used are mentioned for the respective rule sets in the rule set directory 81 may be adopted, instead of storing the head addresses and last addresses of the rule sets, whereby the rules can be stored in the rule table 82 without doubling the rules proper, and the memory size of the memory block 501 can be reduced.

According to the present invention, control logic operations need not be programmed with a general-purpose language such as assembler language, and when a control engineer himself/herself gives the control logic operations as data, condition discriminative control can be performed, so that special programming personnel is not required. In addition, according to the method of describing control logic operations in the present invention, even control logic operations involving complicated conditions which have heretofore required considerable labor for description with a decision table etc. may be merely itemized for respective groups of several conditions by the use of a natural language (the entire condition determination based on the individual itemized logic operations is automatically made by the present invention), and the control logic operations can be readily described and modified. In addition, where an algebraic operation or the like, which cannot be written in the form of a rule coexists with the control logic operation and needs to be described, a procedure name can be designated in rules and a complicated system can also be performed.

We claim:

1. A control system having a controller, for controlling the operation of a plurality of facilities in real time, and memory, coupled to said controller, for storing information in accordance with which said controller controls the operation of said facilities, wherein said memory comprises a rule memory portion which stores information representative of a plurality of rules, each rule containing a conditional portion which describes at least one condition to be examined and a conclusive portion which describes an action to be taken upon said condition being satisfied, and a status memory portion which stores information representative of the current status of each of said facilities, information representative of respective tasks to be performed by said facilities and information representative of the new current status of each of said facilities resulting from the satisfaction of the conditional part of a rule and wherein said controller comprises detecting means for detecting the current status of each of said facilities and generating information representative thereof, input means, coupled with said detecting means, for coupling facility status representative information generated by said detecting means to the status memory portion of said memory to be stored thereby, rule applying means for comparing current status information stored in said status memory with information representative of the conditional portions of the rules stored in said rule memory portion and, in response to the satisfaction of the conditional part of a rule, causing information representative of the conclusive portion of that rule to be stored as the new current status of a facility in the status memory portion of said memory, and for generating information representative of control instructions for controlling the operation of said facilities, said control instruction information being formed by a combination of rules conditional portions of which have been satisfied by the current status of said facilities, and output means, coupled to said rule applying means, for generating command signals for controlling the operation of said facilities in accordance with the control instruction information generated by said rule applying means, and coupling said command signals to respective ones of said facilities.

2. A control system according to claim 1, wherein information stored in said status memory portion representative of tasks to be performed by said facilities includes information representative of a schedule of tasks to be performed, and wherein rule information stored in said rule memory portion includes information representative of rules the conditional portions of which prescribe relationships between said task schedule and the status of respective ones of said facilities and the conclusive portions of which prescribe tasks of said schedule to be executed.

3. A control system according to claim 1 or 2, wherein the rule memory portion of said memory includes a rule management portion for storing information representative of respective groups of said rules and wherein said rule applying means includes means for accessing said rule management portion in response to prescribed status information for a facility, whereby only the rules of a specified group are employed by said rule applying means as a result of said prescribed status information.

4. A control system according to claim 1, wherein the conclusive portion of a rule contains a fixed portion and a parameter portion, said parameter portion being capable of representing a variable and assuming any desired value.

5. A control system according to claim 1, wherein said memory further includes a portion storing information representative of the name of a procedure defined in the conclusive portion of a rule and a portion storing information representative of that portion of memory wherein information representative of steps for carrying out said procedure is located.

6. A control system according to claim 1, wherein the rule portion of said memory further includes a portion which stores rule type information representative of whether or not a rule is employed for finally generating a control instruction, and wherein said rule applying means includes means for generating information representative of control instructions in accordance with said rule type information when processing of a rule associated therewith has been carried out.

* * * * *